3,537,746
NORMALLY RETRACTED, CONTROLLABLY EXTENDABLE PROTECTIVE COVER FOR A MOTORCYCLE SEAT
Thomas A. Peters, 734 N. Inglewood Ave.,
North Hollywood, Calif. 90302
Filed Apr. 8, 1968, Ser. No. 719,494
Int. Cl. B62j 1/18
U.S. Cl. 296—78.1                                      10 Claims

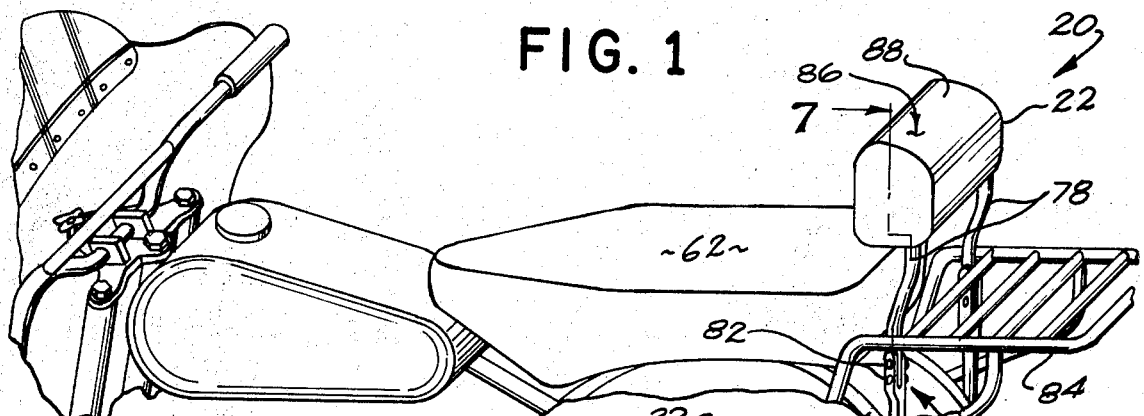
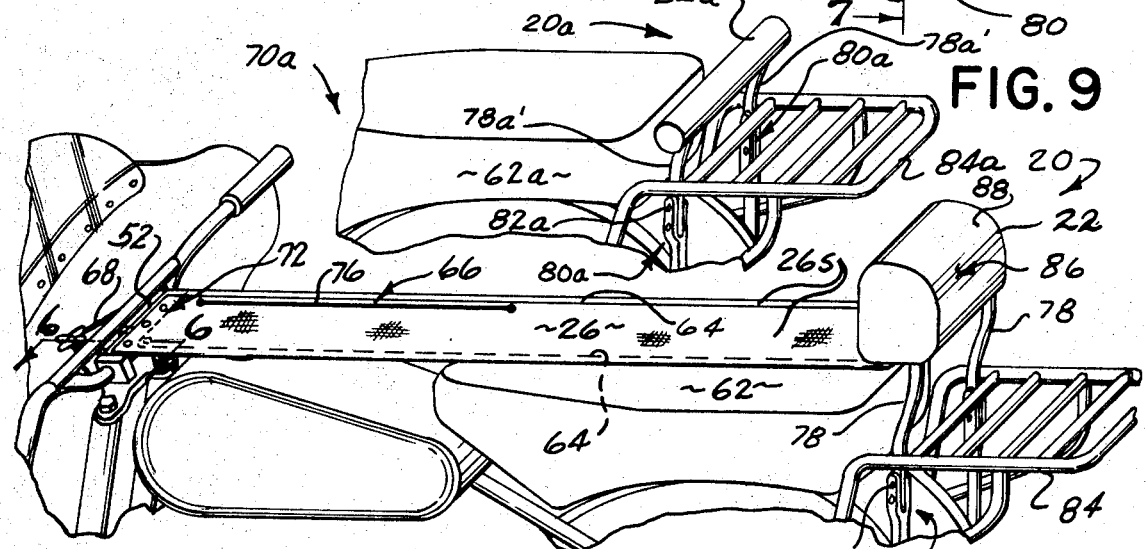
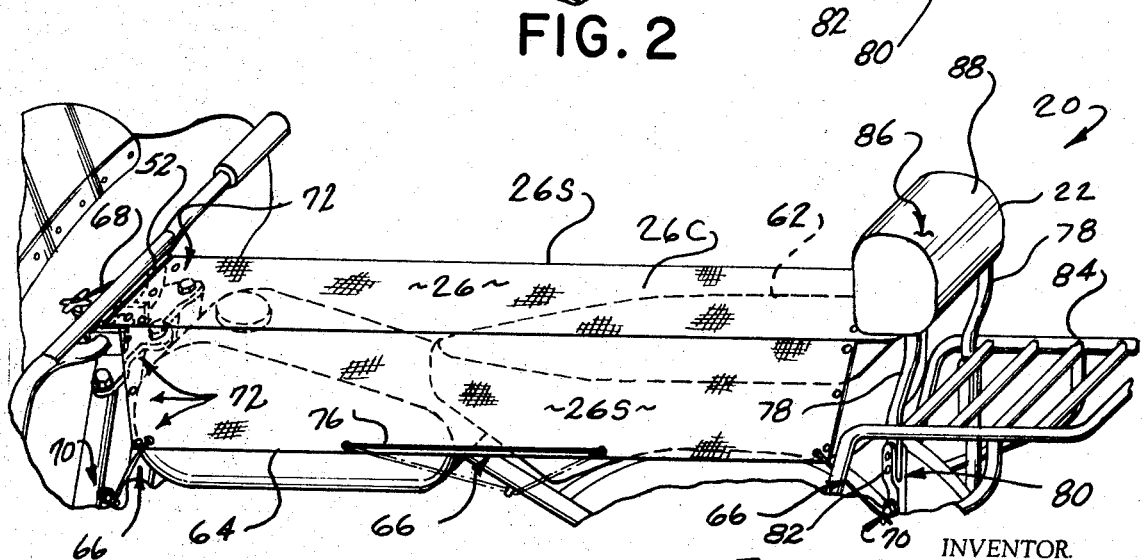

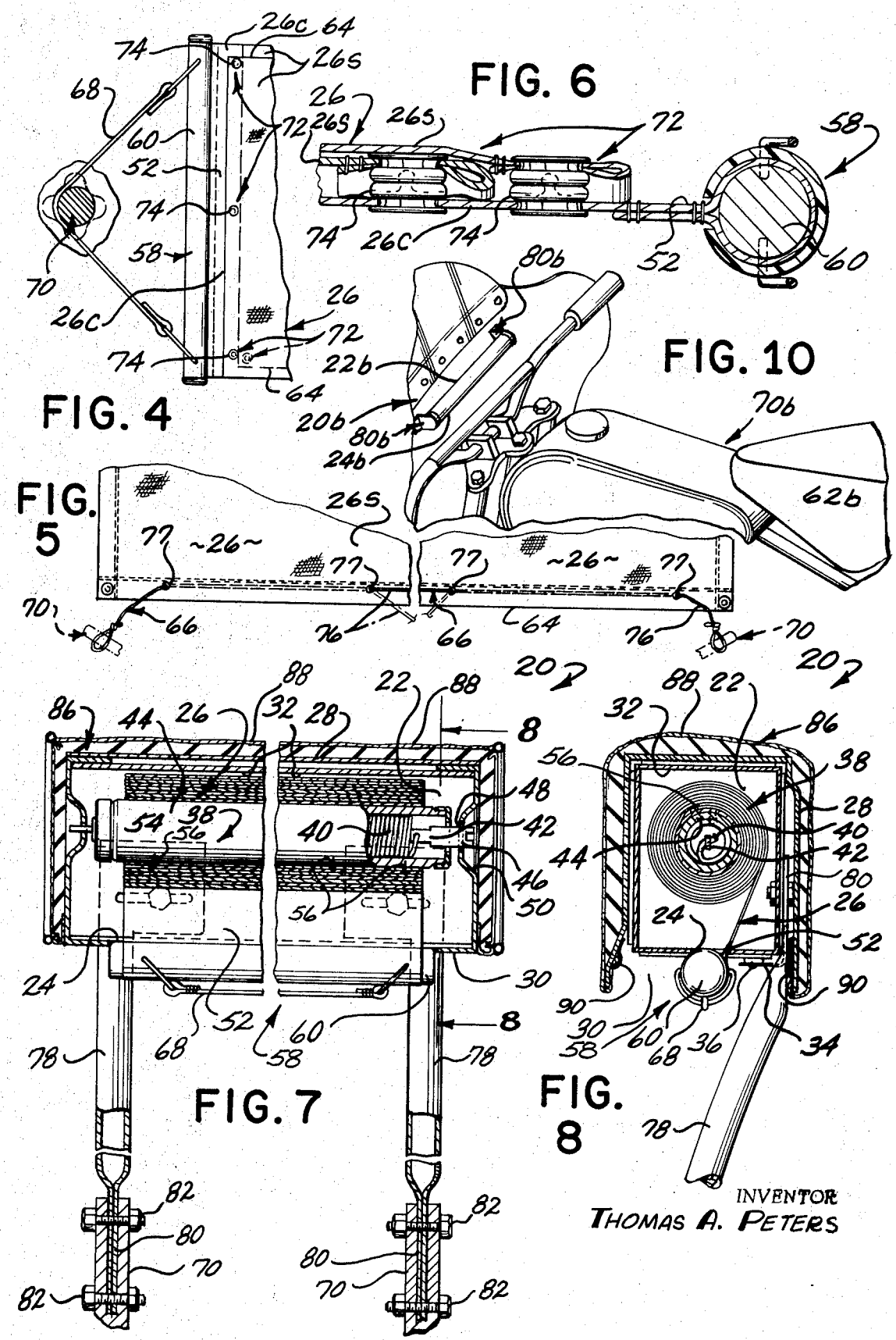

ABSTRACT OF THE DISCLOSURE

The specification discloses the invention in its broadest form as comprising a normally retracted, controllably extendable protective cover for a motorcycle seat and adjacent, underlying portions of a motorcycle. The cover comprises a flexible, waterproof sheet having a central portion adapted to overlie and protect the motorcycle seat, and having side portions adapted to extend downwardly on each side of the motorcycle seat and underlying upper portions of a motorcycle so as to laterally, at least partially, encompass and protect same. The side portions of the sheet are adapted to be folded over the central portion into an overlapped, multiple-layer relationship (usually a three-layer relationship) and, in one preferred form, to be fastened by suitable fastener means in said folded, multiple-layer relationship having an effective folded width such as to be capable of being received within a storage chamber in a laterally directed housing means mounted behind or ahead of the motorcycle seat, although, in one preferred form, it is shown as being mounted behind the motorcycle seat and being provided with compressible padding means at the top and front thereof so as to effectively comprise a backrest for a motorcycle rider, usually an extra or auxiliary motorcycle rider seated behind a primary motorcycle rider who actually drives the motorcycle. The folded, multiple-layer, flexible protective sheet is adapted to be fully retracted and stored, except for a free operating end, in a spirally rolled, stored relationship within the storage chamber inside of the housing means, rolled around a spindle or roller which, in a preferred form, is disclosed as being spring-biased so as to cause automatic retraction of the folded, protective, flexible sheet when desired. Front and side edges of the extended unfolded sheet are provided with retention means, usually of an elastic type, adapted to be engaged with respect to corresponding portions of a motorcycle so as to hold the extended, unfolded sheet in protective relationship overlying and laterally encompassing the motorcycle seat and adjacent underlying portions of the motorcycle.

---

Generally speaking, the present invention, in its broadest sense, comprises an extendable and retractable, flexible, waterproof, protective sheet which is normally stored in an unobtrusive manner and carried by a motorcycle, preferably behind the seat thereof, although, in certain forms it may be stored in front of the seat, and adapted, in certain forms of the invention, to also function as an auxiliary backrest, preferably for supporting the lower back region of a second or auxiliary rider seated behind a primary rider and operator of the motorcycle, although it may, in certain forms of the invention, comprise a backrest for the primary motorcycle rider.

The protective sheet or cover is adapted to be extended from its normally retracted form within the housing means rolled around a central roller in a manner similar to the mounting of a conventional window blind around a window blind roller, by being pulled outwardly therefrom into extended form and to then have overlapped side portions thereof fastened by disengaging fastener means, such as snap fasteners or the like, so that the two side portions thereof overlying the central portion, can be spread out into a protective sheet of substantially three times the width of its pre-opening folded form, after which forward and side edge portions of the sheet, which are provided with resilient or elastic fastener means, are effectively fastened with respect to any conveniently adjacent portions of the motorcycle so as to hold the protective sheet over and in side-encompassing protective relationship with respect to a motorcycle seat.

The protective sheet is primarily intended for such extended, retained, protective usage with respect to a motorcycle seat when the motorcycle is parked outside and might normally get wet from rain, dew, or by any other type of exposure to moisture. This is extremely undesirable because, when a motorcyclist returns to his motorcycle and finds the seat wet, he must either sit on the wet seat with consequent uncomfortable consequences thereof, or must find some means for appropriately drying the seat before he sits on it.

With the protective cover of the present invention, it is merely necessary for the returning motorcyclist to unhook the retaining means so as to release the forward and side edges of the protective sheet, to then fold the side portions of the sheet into overlapped, superimposed relationship with respect to each other and with respect to the central portion of the extended protective sheet, and in forms thereof having the fastener means, to then fasten same and then allow the folded, fastened sheet to be returned into the storage chamber of the housing means in stored relationship spirally wound around the roller mounted therein, which may be accomplished by the spring-biased retracting actuation of said roller. This complete sequence of operations will take only a moment, and it will be found that the protective cover has completely disappeared within the housing, except for the free operating end, and the seat will be completely dry and ready for use by the motorcyclist.

Furthermore, in those forms of the invention where the housing means carrying the protective sheet therein in spirally wound, stored form on the roller, is provided with compressible padding means at the top and front thereof so as to function as an effective backrest, it will be available for such back-engaging, supporting, and retaining usage by an auxiliary rider seated behind the primary rider or, in certain forms of the invention, by the primary rider himself. It should also be noted that, in certain forms of the invention, the housing means may merely comprise housing means not intended to also function as backrest means and may be positioned at either the rear or the front of the motorcycle behind or forwardly of the mtorcycle seat which is to be protected by the protective sheet when extended, unfastened, unfolded, and placed in retaining relationship with respect to projecting portions of the motorcycle in the manner previously described, and all such modified forms of the invention are included within the broad scope of the present invention.

With the above points in mind, it is an object of the present invention to provide a novel protective partial cover for a motorcycle primarily intended to protect a motorcycle seat when extended and placed in retained relationship overlying such a motorcycle seat so that the seat will remain in dry condition irrespective of its positioning outside, fully exposed to the vagaries of inclement weather. The protective sheet comprising the cover, when not in use is normally adapted to be stored in spirally wound, rolled form within a small, relatively unobtrusive housing means carried at either the rear of the motorcycle seat or forwardly thereof at any appropriate location so that the protective cover can be extended from the housing means, either forwardly or rearwardly, and fastened in such extended protective relationship overlying the motorcycle seat through the use of retaining means which, in one form, comprise resilient or elastic means of loop form or otherwise, which can be easily hooked or looped over any adjacent portion of a motorcycle so as to hold the extended protective sheet in the desired protective relationship until manually released and returned to spirally wound, rolled stored form within the housing means.

It is a further object of the present invention to provide a protective motorcycle seat cover of the character referred to in the preceding object, wherein the protective seat cover has a much larger, open, lateral dimension than it has when in rolled, stored form within the housing means, which is accomplished by normally having the protective sheet in multi-layer, folded relationship when stored in spirally wound, rolled form within the housing means and adapted, after extension therefrom, to be laterally unfolded into its much broader lateral dimension.

It is a further object of the present invention to provide a motorcycle seat cover of the character referred to in the preceding object, wherein the retaining means is of a novel edge-mounted elastic member type which can be easily stretched and looped over any adjacent portion of a motorcycle for temporary retaining cooperation therewith.

It is a further object of the present invention to provide a novel motorcycle seat cover of the character referred to herein, wherein the housing means is effectively padded and appropriately positioned behind a motorcycle seat and whereby to effectively comprise, and function as, a back support for a motorcycle rider.

It is a further object of the present invention to provide a novel device of the character referred to herein, having means for enabling it to be conveniently and easily attached to a pre-existing motorcycle frame, seat, or rear rack of a pre-existing motorcycle or to be initially supplied therewith as original equipment. This makes it possible for the device to be supplied as original equipment or as an auxiliary attachment device purchased separately and perhaps later by a motorcyclist for attachment to a pre-existing motorcycle for the purposes outlined hereinbefore.

It is a further object of the present invention to provide a device of the character referred to herein, having any or all of the advantages referred to herein and including any or all of the features referred to herein, generically and/or specifically, and individually or in combination, and which is of relatively simple, compact, easy-to-mount and dismount and easy-to-operate construction such as to facilitate widespread manufacture and general usage of the device as either original equipment or separately manufactured, supplied, and later-attached equipment intended for motorcycle seat protective purposes as outlined hereinbefore or for any other substantially functionally equivalent purposes.

Further objects are implicit in the detailed description which follows hereinafter (which is to be considered as exemplary of, but not specifically limiting, the present invention), and said objects will be apparent to persons skilled in the art after a careful study of the detailed description which follows hereinafter, and all such implicit objects are intended to be included and comprehended herein as fully as if particularly defined and pointed out herein.

For the purpose of clarifying the nature of the present invention, several exemplary embodiments of the invention are illustrated in the hereinbelow-described figures of the accompanying drawings and are described in detail hereinafter.

FIG. 1 is a fragmentary perspective view of one exemplary embodiment of the present invention wherein the housing means effectively comprises a brackrest and is mounted behind a motorcycle seat which is to be protected by the protective sheet when extended from the housing means. In this view, the protective sheet is in fully retracted, stored relationship within the housing means, and the motorcycle is shown fragmentarily for drawing space saving reasons.

FIG. 2 is a fragmentary perspective view very similar to FIG. 1, but shows the device after the protective sheet has been fully extended from the housing means but has not yet been unfastened and laterally unfolded into its full lateral width.

FIG. 3 is a fragmentary perspective view generally similar to FIGS. 1 and 2, but, in this case, illustrates the protective cover of FIG. 2 after it has been unfastened and laterally unfolded into its full lateral width and then has had the extended side portions thereof moved downwardly so as to laterally encompass the motorcycle seat and adjacent portions of the motorcycle and, after it has been temporarily fastened into said protective relationship through the use of the novel retaining means carried at the forward end and along the lateral side edges of the side portions of the unfolded protective sheet.

FIG. 4 is an enlarged, fragmentary view of the forward end of the extended protective sheet clearly illustrating a portion of the elastic retaining means carried thereby.

FIG. 5 is an enlarged, fragmentary view of one of the side edges of the extended unfolded protective sheet clearly illustrating a portion of the elastic retaining means carried thereby, which is generally similar to that carried by the forward or front end as shown in FIG. 4 and which is substantially identical to that carried by the opposite side edge and not separately and independently illustrated since the showing of FIG. 5 is thought to adequately show the similar retaining means carried by both similar side edges.

FIG. 6 is an enlarged, fragmentary, sectional view, taken in the direction of the arrows 6—6 of FIG. 2, and illustrates a representative one of the exemplary type of fastener means shown in the first form of the invention for fastening the folded in, overlapped side portions of the protective sheet in multi-layer superimposed relationship with respect to each other and with respect to the central portion of the protective sheet.

FIG. 7 is an enlarged, partially sectional view, taken substantially on the plane indicated by the arrows 7—7 of FIG. 1, and clearly illustrates the interior construction of the exemplary housing means and the attachment means for attaching same with respect to a structurally strong portion of the motorcycle, in this case a portion of a rear rack of the motorcycle.

FIG. 8 is a view taken substantially along the plane and in the direction indicated by the arrows 8—8 of FIG. 7 and comprises a sectional view at right angles to the plane of FIG. 7 and further illustrates the detailed construction of the exemplary housing means comprising an auxiliary backrest and also clearly illustrates the stored mounting of the multi-layer folded fastened, and fully retracted, spirally wound, stored protective sheet within the housing means.

FIG. 9 is a fragmentary, perspective view, somewhat like a portion of FIG. 1, but illustrates a modified form of the invention wherein the housing means is not primarily intended to function as a backrest but is primarily intended to comprise merely a storage housing means for the multi-layer folded, fastened, and spirally wound and stored protective cover when not in use.

FIG. 10 is a fragmentary, perspective view, similar in many ways to FIG. 9, but illustrates a further modification of the invention wherein the housing means is positioned forwardly of a motorcycle seat which is to be protected by the protective sheet when extended from its normally fully retracted, stored relationship within the housing means.

Generally speaking, the present invention comprises a housing means, a first exemplary form of which is generally indicated at 20, and which has, in a preferred form, a substantially downwardly open storage chamber 22 defined therewithin which is provided with a downwardly directed exit slot 24 at the bottom thereof through which a folded, thin, flexible protective sheet, indicated generally at 26, is adapted to be controllably extended and retracted.

In the exemplary first form of the invention illustrated, the housing means, indicated generally at 20, comprises an outer housing portion 28 which has a large bottom opening 30 and an inner housing portion 32 which is adapted to be mounted within the outer housing portion 28 in a controllably removable manner, thus facilitating assembly and disassembly thereof for repair or replacement of any of the moving portions of the device.

In the example illustrated, the two outer and inner housing portions 28 and 32 effectively comprise the previously mentioned housing means generally designated by the reference numeral 20. However, it should be clearly understood that this is merely one exemplary construction of said housing means 20 and is not to be construed as specifically limiting the invention to an arrangement having such separable outer and inner housing portions as those indicated at 28 and 32, respectively.

In the example illustrated, the inner housing portion 32 is fastened within the outer housing portion 28 by a strap 34 and a snap fastener 36. However, again it should be noted that this is merely exemplary and is not to be construed as specifically so limiting the invention.

The inner housing portion 32 is actually the one which has the previously mentioned narrow exit slot 24 therein, although if a single housing is employed it would, of course, define the narrow exit slot 24.

The flexible protective sheet 26 is adapted to normally be stored in spirally wound form within the storage chamber 22 carried around a central, laterally directed roller means, indicated generally at 38, which is similar in many respects to a conventional window blind roller. This is accomplished by reason of the fact that the roller means 38 is effectively spring-biased into what might be termed a retracted relationship—that is, a relationship such that the roller means 38 as shown in FIG. 8 is normally biased in a counterclockwise direction which corresponds to full retraction of the folded protective sheet 26 in a manner such as is clearly shown in FIGS. 1, 7, and 8.

The biasing spring means is indicated at 40 and comprises a helically wound spring mounted on a central rod 42 and having one end of the spring 40 fastened to the rod 42 and having the other end of the spring 40 fastened to the outer sleeve 44 of the roller means 38. Thus, when the rod 42 has the flat, spatulate end 46 thereof nonrotatively mounted in a slotted mounting member 48 carried by one end wall 50 of the inner housing 32, this effectively biases the outer sleeve 44 of the complete roller means 38 in a counterclockwise direction as viewed in FIG. 8 and, thus, will normally function to retract the folded protective sheet 26 if it has previously been in extended form, or will function to maintain it in fully retracted form until the action of the spring 40 is effectively manually overridden by grasping the outer free end 52 of the folded protective sheet 26 and forcibly manually pulling same downwardly and forwardly with respect to the exit slot 24. This will, of course, forcibly rotate the roller means 38 in clockwise direction as viewed in FIG. 8 against the action of the biasing spring means 40.

The above-mentioned type of extension operation is for the purpose of placing the normally multi-layer, folded, fastened, and spirally wound, thin protective sheet 26 in an extended position for unfastening lateral unfolding and positioning thereof over a motorcycle seat in a retained protective relationship such as is clearly shown in the sequence of steps illustrated in FIGS. 2 and 3. This will be described in greater detail hereinafter.

The thin protective sheet 26 may be made of flexible, waterproof material such as waterproofed "Nylon" or the like, although it may be made of any other suitable thin, flexible, waterproof material, and normally has a lateral dimension when fully opened much greater than the lateral dimension of the complete housing means 20. This is accomplished through the provision of a longitudinal central portion 26C of the sheet 26 and two integrally connected side portions 26S thereof. The central portion 26C terminates in the previously mentioned outer free end 52 and, at the opposite extremity thereof, in a rear inner end 54 which is effectively attached as indicated at 56 to the exterior of the outer sleeve 44 of the complete roller means 38. The attachment at 56 may be by means of tacks, adhesive fastening means, or any other functional equivalent.

In the exemplary first form of the invention illustrated, the free outer end 52 is effectively provided with what might be termed a combination actuating and stop means, indicated generally at 58, and which takes the form of a laterally directed rod 60 attached to said free outer end 52 of the central portion 26C of the protective sheet 26, and is of a size such as to be incapable of passing inwardly through the previously mentioned exit slot 24 and thus functions to at all times maintain the free outer end 52 of the central portion 26C of the protective sheet 26 exterior of the housing means 20 so that it can be manually grasped for extension of the protective sheet 26 when it is desired to protect a motorcycle seat, such as is generally indicated at 62.

Each of the two side portions 26S of the protective sheet 26 terminates laterally in a similar longitudinal side edge 64 which is provided with resilient or elastic retaining means portions, indicated generally at 66, similar in many respects to corresponding resilient or elastic retaining means portions, indicated at 68, carried by the previously mentioned combination actuating and stop means 58. All of said elastic retaining means portions 66 and 68 are adapted for use in temporarily engaging adjacent parts of a motorcycle, such as is generally designated by the reference numeral 70, when the extended, unfastened, and laterally opened-up protective sheet 26 is placed over the motorcycle seat 62 for the purpose of protecting same from moisture, dust, or the like, in a manner such as is most clearly shown in FIG. 3. Said retaining means 66 and 68 will be described in greater detail hereinafter.

Normally speaking, when the protective sheet 26 is either extended or retracted or is stored within the housing means 20, it is in the form of a multi-layer folded, overlapped sheet wherein the two side portions 26S are successively folded over the center portion 26C of the complete protective sheet 26 so as to lie in a multiple-layer, superimposed relationship with respect to each other and with respect to the central sheet portion 26C. In the exemplary first form of the invention illustrated, since there are two such side portions 26S and one central sheet portion 26C, the folded arrangement of the sheet will comprise a three-layer, folded configuration, as is perhaps most clearly shown in FIGS. 2 and 6, wherein one of the side portions 26S overlies both the other side portion 26S and the central sheet portion 26C, and is fastened in said relationship by fastening means, indicated generally at 72, which, in the example illustrated, comprises a plurality of snap fasteners 74. This three-layer, folded configuration of the complete protective sheet 26 wherein the side portions 26S and the central portion 26C are superimposed upon each other and held in such relationship by the fastening means 72, makes it possible to store the entire protective sheet 26 in the relatively laterally short housing means 20.

It will be understood that, normally, the folded, stored sheet 26 can be extended from the stored relationship shown in FIGS. 1, 7, and 8, by merely grasping the actuating and stop means 58, comprising the laterally directed enlarged rod 60, and applying forward force thereto so as to pull the free end 52 of the folded protective sheet 26 downwardly and forwardly with respect to the exit slot 24 of the housing means 20 until it has been extended forwardly to a sufficient degree to provide adequate coverage of the motorcycle seat 62, at which time fastening means 72 is unfastened and the side portions 26S of the sheet 26 are folded outwardly from the folded, fastened shown in FIG. 2 and then downwardly into the laterally adjacent and laterally encompassing relationship shown in FIG. 3 wherein the central portion 26C of the sheet overlies the motorcycle seat 62 while the two side portions 26S of the protective sheet extend downwardly on each side of the motorcycle seat 62 and protect the sides thereof and also corresponding upper portions of the motorcycle 70. This is clearly shown in FIG. 3, where in the protective sheet 26 is shown as being retained in such protective relationship by the previously mentioned resilient or elastic retaining means indicated at 66 and 68, which effectively comprise, respectively, a forwardly directed elastic loop 66 which can be looped over the motorcycle handlebars or any forward portion of the motorcycle in a retaining manner which will prevent rearward movement of the protective sheet 26 as a result of the biasing force exerted by the biasing spring means 40. The side retaining means portions 68 comprise similar elastic members 76 carried along the longitudinal side edges 64 of the side portions 26S of the protective sheet by means of fastening aperture-defining eyelet means 77 in a manner such as to be available to be manually grasped and pulled downwardly for looping over any adjacent projecting portion of the motorcycle 70 so as to hold said side portions 26S in the downwardly directed protective relationship best shown in FIG. 3.

It will readily be understood that both of the elastic retaining means 66 and 68 can be manually engaged very simply and easily with respect to adjacent parts of the motorcycle 70 and can be just as easily manually disengaged therefrom when the protective sheet 26 is to be again stored within the housing means 20. When this is done, the next succeeding step after disengaging the side retaining means 68 from the previously engaged portions of the motorcycle 70 will be to first fold one of the side portions 26S into a centrally located position directly overlying the central portion 26C of the protective sheet, followed by the folding thereover of the other side portion 26S and the fastening of the snap fasteners 74 so as to provide the three-layer narrow sheet configuration best shown in FIGS. 2 and 6. Immediately thereafter, the entire folded sheet will then be released by disengaging the previously engaged front retaining means 66 and allowing the roller biasing spring means 40 to rotate the roller in a counterclockwise retraction direction as viewed in FIG. 8, which will return the folded, fastened protective sheet 26 to the spirally wound, fully stored, retracted relationship best shown in FIGS. 1, 7, and 8.

The extension operation is the reverse from the retraction operation just described.

In the exemplary first form of the invention illustrated, the housing means indicated generally at 20 is shown as being provided with downwardly directed fastening arm means 78 and attachment means 80 at the bottom thereof adapted for rigid structural attachment with respect to a corresponding rigid structural portion of the motorcycle 70. In said exemplary first form of the invention illustrated, the attachment means 80 is fastened by threaded fastener means 82 with respect to a rear-positioned motorcycle rack 84 which comprises the previously mentioned rigid structural portion of the motorcycle 70 in this exemplary form of the invention. However, it should be clearly understood that the invention is not specifically limited to this particular location of attachment or to attachment to such a rack. This will be clarified in greater detail hereinafter with respect to the modified form of the invention illustrated in FIG. 10.

In the exemplary first form of the invention illustrated, the housing means, indicated generally at 20, is provided with compressible, exterior, elastomeric padding, indicated generally at 86, which may comprise foam or sponge rubber or cellular plastic material, in either case of either the interconnected cellular type or the isolated cellular type and which preferably may be of a high hysteretic loss characteristic type which provides very effective damping of oscillatory movement, although the invention is not specifically so limited.

In the example illustrated, the padding means 86 is fastened to the top and front of the outer housing member 28 by a suitable flexible cover 88 positioned exterior thereof and extending upwardly a short distance into the large bottom opening 30 of the outer housing 28 and then being fastened therein by suitable fastening strips such as indicated at 90, or by any other suitable fastening means. However, it should be clearly understood that the invention is not limited to this specific type of construction.

The padding means 86 and the positioning of the housing means 20 rearwardly of the motorcycle seat 70 causes it to effectively comprise a backrest for a motorcycle rider, which may be intended as a backrest for a second or auxiliary motorcycle rider sitting behind a primary motorcycle rider, or which may be suitably positioned to function as a backrest for a primary motorcycle rider. Such a backrest is useful in that it firmly positions a motorcycle rider at a proper location and provides firm and auxiliary support for the lower back region of the motorcycle rider, which is a highly desirable feature, particularly when a motorcycle may be ridden over relatively rough roads or terrain, which might otherwise tend to dislodge a rider and possibly cause serious injury to such a rider.

FIG. 9 illustrates a slight modification of the invention and because it is a modification, parts which are similar structurally or functionally are designated by similar reference numerals, followed by the letter "a," however.

In the FIG. 9 modification, the housing means indicated generally at 20a is positioned much lower than the housing means 20 of the first form of the invention, and is intended to function primarily merely as a housing means rather than as a backrest, particularly for an auxiliary or second rider sitting behind a primary or main rider of a motorcycle such as that shown at 70a. Otherwise, the housing means 20a of this modification, and all other portions of the device are generally similar to those of the first form of the invention, and it is believed that no additional detailed description thereof is necessary or desirable and, indeed, would be redundant. The only real difference of this modification is the fact that no auxiliary padding means is provided and the mounting of the housing means 20a is provided by a modified structure wherein the fastening arm means 78a and attachment means 80a are somewhat differently shaped and provide very much less elevation than in the first form of the invention and need not be attached to a rack but may be attached at any appropriate location behind the motorcycle seat 62a or may be positioned substantially forwardly thereof as will be described hereinafter in connection with the FIG. 10 modification of the invention.

FIG. 10 illustrates a further slight modification of the invention wherein all parts which are structurally or functionally similar to either the first form of the invention illustrated in FIGS. 1–8 or the first modification of the invention illustrated in FIG. 9, are indicated by similar reference numerals, followed by the letter "b," however.

In the FIG. 10 modification, it will be noted that the structure is substantially the same as the FIG. 9 modification, with the major difference being the front mounting of the housing means 20b spaced forwardly of the motorcycle seat 62b rather than rearwardly thereof as in the case of the FIG. 9 modification. Thus, the protective cover will be drawn rearwardly over the motorcycle seat 62b and will have the side portions extended downwardly at each side thereof and will be held by retaining means in a manner generally similar to the showing of the first form of the invention illustrated in FIGS. 1–8 except for a reversal of the positioning thereof from the forwardly directed relationship of the extended protective sheet shown in the first form of the invention to an oppositely rearwardly directed relationship thereof in the FIG. 10 modification of the invention, which is not shown in such extended, retained, protective relationship since it is believed that this would be redundant in the light of the full disclosure and showing of the first form of the invention already provided herein and in the accompanying drawings.

The protective cover, or thin sheet, in any of the various forms of the invention may be made of any suitable material appropriately waterproofed or of an inherently waterproof nature and preferably of a mildew-proof, rot-proof type and also preferably of a type capable of being folded in the manner of the present invention, without the development of any cracks along the fold lines. It should also be noted that the retaining means, such as shown at 66 and 68 in the first form of the invention, may be modified substantially within the broad scope of the invention, as may the detailed construction of the housing means and the positioning of the exit slot. All of these and various other features may be modified within the broad scope and teachings of the present invention, and all such arrangements are intended to be included and comprehended herein.

It should be understood that the figures and the specific description thereof set forth in this application are for the purpose of illustrating the present invention are are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. A normally retracted controllably extendable protective cover for a motorcycle seat, comprising: a housing means having a hollow protective sheet receiving storage chamber defined therewithin; and a thin, waterproof flexible protective sheet including side portions and a longitudinal central portion of a length and width, when fully extended and opened, sufficient to completely cover a motor cycle seat and adapted to have said side portions thereof folded downwardly in partially side-encompassing relationship with respect to a motorcycle seat and an underlying upper portion of a motor cycle, said protective sheet being substantially wider than the maximum lateral dimension of said protective sheet receiving storage chamber within said housing means and normally having said side portions of said protective sheet folded over said central portion thereof in overlapped multiple-layer relationship so as to have an over-all folded width less than said maximum lateral dimension of said protective sheet receiving storage chamber whereby to be capable of being, and normally being, received and stored in spirally rolled storage relationship therewithin, said central portion of said sheet having a free outer end normally projecting outwardly from said storage chamber when said folded sheet is fully stored in spirally wound storage relationship therewithin; said housing means being provided with fastening and attachment means carried thereby for rigid structural attachment with respect to a corresponding rigid structural portion of a motor cycle at a position behind and extending above the level of a motorcycle seat which is to be protected from the elements when a motorcycle carrying same is parked and said normally folded, fully retracted, spirally wound and stored protective sheet is extended from said storage chamber unfolded, and placed in retained, overlying and partially side-encompassing relationship with respect to a motorcycle seat.

2. Apparatus as defined in claim 1, wherein said sheet is provided with an enlarged, manually graspable actuating and stop means attached to said free outer end of said central portion of said normally folded, spirally wound, stored protective sheet.

3. Apparatus as defined in claim 1, wherein the central portion of said protective sheet has a rear inner end at the opposite extremity thereof from said free outer end thereof effectively provided with and attached to a blind-type mounting roller means rotatably mounted within said protective sheet receiving storage chamber of said housing means in a laterally extending direction.

4. Apparatus as defined in claim 1, wherein the central portion of said protective sheet has a rear inner end at the opposite extremity thereof from said free outer end thereof effectively provided with and attached to a blind-type mounting roller means rotatably mounted within said protective sheet receiving storage chamber of said housing means in a laterally extending direction and being provided with inner spring biasing means normally biasing said roller means into a fully retracted position such as to normally maintain the folded protective sheet in fully retracted storage position within said storage chamber spirally wound around the exterior of said roller means.

5. Apparatus as defined in claim 1, wherein said sheet is provided with an enlarged, manually graspable actuating and stop means attached to said free outer end of said central portion of said normally folded, spirally wound, stored protective sheet, said actuating and stop means carried by said free outer end of said central portion of said protective sheet being provided with longitudinal retaining means adapated to be removably placed in retaining engagement with respect to a longitudinally adjacent part of a motorcycle when in extended protective covering relationship over a motorcycle seat whereby to hold and maintain the extended protective sheet in motorcycle-seat-protecting relationship.

6. Apparatus as defined in claim 5, wherein said side portions of said protective sheet terminate in longitudinal side edges provided with side retaining means adapted to be removably placed in retaining relationship with respect to adjacent parts of a motorcycle whereby to positively retain said side portions of said protective sheet in downwardly directed, partially side-encompassing relationship with respect to a motorcycle seat and underlying adjacent portions of a motorcycle.

7. Apparatus as defined in claim 1, wherein said side portions of said protective sheet terminate in longitudinal side edges provided with side retaining means adapted to be removably placed in retaining relationship with respect to adjacent parts of a motorcycle whereby to positively retain said side portions of said protective sheet in downwardly directed, partially side-encompassing relationship with respect to a motorcycle seat and underlying adjacent portions of a motorcycle.

8. Apparatus as defined in claim 1, including folded-sheet fastening means carried by mating surface of said protective sheet at positions such as to be capable of fastening cooperation with each other when said side portions of said sheet are folded over said central portion thereof in overlapped multi-layer relationship whereby to positively retain said sheet in said folded relationship during extension or retraction thereof from and back into said storage chamber within said housing means, respectively.

9. Apparatus as defined in claim 1, wherein said housing means is effectively provided with compressible exterior padding means positioned at the front and top of said housing means whereby to cause said housing means to effectively comprise a backrest for a motorcycle rider.

10. A normally retracted controllably extendable protective cover for a motorcycle seat, comprising: a housing means having a hollow protective sheet receiving storage chamber defined therewithin; and a thin, waterproof flexible protective sheet including side portions and a longitudinal central portion of a length and width, when fully extended and opened, sufficient to completely cover a motorcycle seat and adapted to have said side portions thereof folded downwardly in partially side-encompassing relationship with respect to a motorcycle seat and an underlying upper portion of a motorcycle, said protective sheet being substantially wider than the maximum lateral dimension of said protective sheet receiving storage chamber within said housing means and normally having said side portions of said protective sheet folded over said central portion thereof in overlapped multiple-layer relationship so as to have an over-all folded width less than said maximum lateral dimension of said protective sheet receiving storage chamber whereby to be capable of being, and normally being, received and stored in spirally rolled storage relationship therewithin, said central portion of said sheet having a free outer end normally projecting outwardly from said storage chamber when said folded sheet is fully stored in spirally wound storage relationship therewithin; said housing means being provided with downwardly directed fastening arm means and attachment means carried thereby for rigid structural attachment with respect to a corresponding rigid structural portion of a motorcycle comprising a rear-positioned motorcycle rack at a rearwardly spacedly adjacent position with respect to a motorcycle seat which is to be protected from the elements when a motorcycle carrying same is parked and said normally folded, fully retracted, spirally wound and stored protective sheet is extended from said storage chamber, unfolded, and placed in retained, overlying, and partially side-encompassing relationship with respect to a motorcycle seat, said housing means being effectively provided with compressible exterior elastomeric padding means comprising a sponge-like cellular elastomeric material having high hysteretic loss characteristics and, consequently, effective damping characteristics, said padding means being positioned at the front and top of said housing means whereby to cause said housing means to effectively comprise a backrest for a second auxiliary motorcycle rider sitting behind a primary motorcycle rider.

References Cited

UNITED STATES PATENTS

| | | | |
|---|---|---|---|
| 1,181,796 | 5/1916 | Pendleton. | |
| 1,357,239 | 11/1920 | Krok | 296—78.1 |
| 2,536,592 | 1/1951 | Caesar et al. | 297—221 |
| 2,851,303 | 9/1958 | McQueen | 296—95 |
| 3,191,965 | 6/1965 | Wilkens | 297—243 |
| 3,269,773 | 8/1966 | O'Connor | 297—243 X |

FOREIGN PATENTS

| | | |
|---|---|---|
| 518,626 | 3/1955 | Italy. |
| 614,884 | 2/1961 | Italy. |

KENNETH H. BETTS, Primary Examiner

U.S. Cl. X.R.

280—289; 297—184, 352